UNITED STATES PATENT OFFICE.

SIGMUND FRÄNKEL, OF VIENNA, AUSTRIA-HUNGARY.

MANUFACTURE OF DIASTASE.

1,129,387. Specification of Letters Patent. Patented Feb. 23, 1915.

No Drawing. Application filed August 7, 1913. Serial No. 783,600.

*To all whom it may concern:*

Be it known that I, SIGMUND FRÄNKEL, a subject of the Emperor of Austria-Hungary, residing at Vienna, Austria-Hungary, have invented new and useful Improvements in the Manufacture of Diastase, of which the following is a specification.

This invention relates to the manufacture of diastase.

A kind of biological process of manufacturing diastase has already been proposed to take the place of the known processes for manufacturing this product by chemical means that is by precipitation from diastase extracts by means of precipitants (such for instance as alcohol), which consists in preparing solutions of diastase free from germs by means of filtration and by causing the fermentation of the sterile filtrates by suitable cultivated yeasts. After concentration in vacuum when at the same time the alcohol formed distils over, and after subsequent drying of the dialyzed product a powder is obtained which is free from carbohydrate and proteins. Due to the fermentation thereof not only the carbo-hydrates are split but also nitrogen containing substances are removed because these latter substances are used up by the growth of the ferment. This process, however, although it can be worked is, on account of the large quantities of malt extract to be filtered by means of Pukall's cells or the like, very expensive and troublesome.

Now it has been found that the maintenance of a pure fermentation is not necessary at all but it has been observed that the process can be carried out not only in a simpler but also at the same time in a more technical manner in such way that yeasts are employed which live in symbiosis with lactic acid bacteria, if at the same time care is taken to neutralize the lactic acid formed from the fermentable carbo-hydrates. Now suitable ferments are always to be found in the ordinary yeasts because all these yeasts when prepared as an article of manufacture are purposely mixed with lactic acid producing bacteria. The removal of the carbohydrates and nitrogen containing substances is principally done in the same manner as with the old process. However, the troublesome method of purification from germs by means of filtration which has, moreover, to be preceded by a very carefully executed chemical purification by means of lead acetate solution, is entirely obviated. A further not unimportant advantage is that in consequence of the neutralization of the fermentation lactic acid by means of suitable inorganic salts as for instance calcium carbonate, the lactate of calcium which crystallizes out on concentration carries with it all the impurities. In this way after filtering off a pulp of crystals rich in diastase is obtained, which is free from unnecessary admixtures and which is from its inception in solid form and is exceedingly suitable for technical use, and in the filtrate a syrupy solution of pure diastase is obtained which can be brought to dryness in any known manner. As example of the carrying out of the invention the following may be mentioned: Pale (Pilsener) kiln-dried malt is mashed in the usual manner with four times its amount of water, whereupon the mash is separated as quickly as possible from the grains. It is preferable to start from a malt extract prepared in the cold (at about 20° centigrade) because in this case the malt residue can be used for other purposes as for instance for the purpose of spirit or yeast manufacture. The wort, after the addition of ordinary pressed yeast, and with the addition of calcium carbonate is left to ferment. The entire filtrate which must not contain any reducing sugar is concentrated *in vacuo* until the lactate of calcium starts to crystallize. Thereupon the highly concentrated solution is left preferably in the cold to crystallize out completely until a solid crystal pulp is formed. This is quickly filtered off under suction and pressed out until a fairly dry mass is obtained. Diastase is now present in good quantities in the syrup as well as in the crystals. For further purification of the syrupy solution the usual methods are employed.

It has already been proposed to manufacture pure diastase by removing from a filtered malt extract prepared in the cold the admixtures which have no diastasic activity, by fermenting the extract by means of yeasts which have an avidity for nitrogen. From the fact that no directions have been given for the sterilization of the extracts in this process it is to be assumed that in the carrying out of the process according to the directions given a certain amount of lactic acid is formed. This earlier proposal, however, prescribes the working with beer yeasts (barm), the importance of using yeasts which contain a larger quantity of lactic acid bacteria was therefore in no way recognized. This is evident from the fact that no precautions are given for neutralizing the lactic acid formed. However, when larger quantities of this acid are formed without neutralizing same, the process could not have been carried out because the diastase would have been destroyed.

What I claim as my invention and desire to secure by Letters Patent of the United States is:—

1. A process for the manufacture of pure diastase by removal of the carbohydrates and nitrogen-containing substances by fermentation of malt extract without previously freeing the same from germs, comprising fermenting the extract with yeast mixed with lactic acid bacteria and neutralizing by an alkaline salt the lactic acid formed by the fermentation.

2. A process of manufacturing diastase which consists in fermenting a malt extract to remove the carbohydrates and nitrogen-containing admixtures therefrom, adding lactic acid bacteria, and neutralizing by the addition of an alkaline salt the lactic acid produced by fermentation.

3. A process of manufacturing diastase consisting in preparing the same biologically from a malt extract consisting in fermenting such extract with a yeast living in symbiosis with lactic acid bacteria and neutralizing the lactic acid formed thereby.

4. A process of manufacturing diastase from malt extract comprising fermenting the extract by means of yeast having lactic acid bacteria mixed therewith in its manufacture, without previously removing from the extract germs contained therein, to remove the carbohydrates and nitrogen-containing components, and neutralizing the lactic acid formed by such fermentation.

5. A process of manufacturing diastase from malt extract comprising fermenting the extract by means of yeast having lactic acid bacteria mixed therewith in its manufacture, without previously removing from the extract the germs contained therein, to remove the carbohydrates and nitrogen-containing components, concentrating the solution and causing the lactate of calcium to crystallize out until a solid crystal pulp is formed, and filtering off and pressing said pulp.

SIGMUND FRÄNKEL.

Witnesses:
JOSEPH C. STADLER,
AUGUST FUGGER.